United States Patent
Kaye et al.

(10) Patent No.: US 11,457,028 B2
(45) Date of Patent: Sep. 27, 2022

(54) SYSTEMS AND METHODS FOR EMERGENCY SHUTDOWN AND RESTORE OF ACCESS ENTITLEMENTS RESPONSIVE TO SECURITY BREACH

(71) Applicant: SailPoint Technologies, Inc., Austin, TX (US)

(72) Inventors: Neal Kaye, Austin, TX (US); Rohit Gupta, Pittsford, NY (US)

(73) Assignee: SAILPOINT TECHNOLOGIES, INC., Wilmington, DE (US)

( * ) Notice: Subject to any disclaimer, the term of this patent is extended or adjusted under 35 U.S.C. 154(b) by 371 days.

(21) Appl. No.: 16/725,541

(22) Filed: Dec. 23, 2019

(65) Prior Publication Data
US 2021/0194895 A1    Jun. 24, 2021

(51) Int. Cl.
*H04L 9/40* (2022.01)
*G06F 21/55* (2013.01)
*G06F 16/23* (2019.01)

(52) U.S. Cl.
CPC ...... *H04L 63/1416* (2013.01); *G06F 16/2379* (2019.01); *H04L 63/102* (2013.01)

(58) Field of Classification Search
None
See application file for complete search history.

(56) References Cited

U.S. PATENT DOCUMENTS

| | | | |
|---|---|---|---|
| 10,614,208 B1* | 4/2020 | Edwards | G06F 21/45 |
| 10,735,397 B2* | 8/2020 | Ronda | H04L 63/08 |
| 2008/0172726 A1* | 7/2008 | Ellis | G06F 21/55 726/6 |
| 2018/0054429 A1* | 2/2018 | Donahue | G06F 21/577 |
| 2019/0005098 A1* | 1/2019 | Frank | G06F 16/2462 |
| 2019/0005488 A1* | 1/2019 | Dietrich | G06Q 20/3572 |

* cited by examiner

*Primary Examiner* — Joseph P Hirl
*Assistant Examiner* — Hassan Saadoun
(74) *Attorney, Agent, or Firm* — Sprinsle IP Law Group (57) ABSTRACT

Responsive to a user instruction or a security breach occurring in an enterprise computing environment, an emergency shutdown and restore module is adapted to obtain and evaluate an identity population definition to determine a population of identities (e.g., a forensic team) associated with accounts distributed across applications in the enterprise computing environment. The emergency shutdown and restore module is further adapted to determine source systems of such accounts and communicate with those source systems via source-specific connectors. The emergency shutdown and restore module can respectively request the source systems to shut down access to the applications by the accounts associated with the population of identities, or to exclude the accounts associated with the population of identities in shutting down access to the applications. After performing a security breach analysis, the emergency shutdown and restore module can request the source systems to restore access respectively, significantly reducing impact to enterprise operations.

20 Claims, 10 Drawing Sheets

Home | My Work ▽ | Identities ▽ | Applications ▽ | Intelligence ▽ | Setup ▽ | ⚙ ▽ | 🔔 | The Administrator ▽

Emergency Action

Accounts
Action
◉ Suspend
○ Restore
Suspend action will disable accounts and Restore will enable accounts

Population and Application
Include Identity Population (Optional)

[ Only Active Contractor Population ▼ ]

Please select identity population that will be included for the suspension/restore of accounts. In case no population is selected, all identities will be acted upon.

Exclude Administrative Population

[ Security Officer Population ▼ ] ← 410

Please select administrative population that will be excluded for the suspension/restore of accounts ☐ All Application Accounts
All Application Accounts will be Suspended/Restored

Applications

[ ▼ ]

Please select application names where access will be suspended

[ Active Directory ✕ ] ← 420

Advanced Analytics

Search Type [Identity ▾]

[Advanced Search]

Search Criteria ⊙

Identity Attributes ← 510

Standard Attributes

- Last Name: [ ]
- First Name: [ ]
- Username: [DEMO1]
- Display Name: [ ]
- Email: [ ▾]
- Manager: [ ▾]
- Is Inactive: [ ▾]
- Is Manager: [ ▾]
- Type: [ ▾]
- Software Version: [ ]
- Administrator: [ ▾]

Searchable Attributes

- Implicit Joiner: [ ]
- Middle Name: [ ]
- Contractor Expiration Date: [ ]
- Contractor Manager: [ ]
- Service Account Owner: [ ▾]
- Service Cube: [ ▾]
- Global Id: [ ▾]
- Joiner Date: [ ▾]
- Leaver Date: [ ▾]
- User Type: [ ▾]
- User Status: [ ▾]
- Contractor Profile ID: [ ▾]

Fields to Display ⊙

Identity Fields

- ☐ Administrator
- ☐ Applications
- ☐ Assigned Roles
- ☐ Contractor Department ID
- ☐ Contractor Expiration Date
- ☐ Contractor Manager
- ☐ Contractor Profile ID
- ☐ Contractor Vendor ID
- ☐ Department IDs Managed By Account Administrator
- ☐ Department IDs Managed By Account Sponsor
- ☐ Department IDs Managed By Profile Manager
- ☐ Detected Roles
- ☐ Display Name
- ☐ Email
- ☐ First Name
- ☐ Global Id
- ☐ Implicit Joiner

[Run Search]  [Clear Search]

SYSTEMS AND METHODS FOR EMERGENCY SHUTDOWN AND RESTORE OF ACCESS ENTITLEMENTS RESPONSIVE TO SECURITY BREACH

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD

This disclosure relates generally to network security and, more particularly, this disclosure relates to identity and access management in a distributed and networked computing environment. Even more particularly, this disclosure relates to systems, methods, and computer program products for security breach analyses in a distributed and networked computing environment, useful for emergency shutdown and restoration of access entitlements of identities during and/or after security breaches.

BACKGROUND

Identity Management (IM), also known as Identity and Access Management (IAM) or Identity Governance (IG), is the field of computer security concerned with the enablement and enforcement of policies and measures which allow and ensure that the right individuals access the right resources at the right times and for the right reasons. It addresses the need to ensure appropriate access to resources across increasingly heterogeneous technology environments and to meet increasingly rigorous compliance requirements. Escalating security and privacy concerns are driving access risk management, among others, to the forefront of identity management.

Currently, companies and organizations alike (collectively referred to hereinafter as "enterprises") lack computer-implemented solutions that can quickly and easily way shut down all accesses or a subset of accesses of their identities in order to perform security analyses during actual or potential security breaches. A prior identity and access management solution involves manually unplugging wires on enterprise directory server and computer systems to completely power down these systems. This manual shutdown approach can lead to downtime. To bring the systems back up can take time which, in turn, increases operation costs and waste of resources. Wth this manual shutdown approach, after a security breach analysis is performed, there is not an easy, fast, or efficient way to restore the access entitlements of identities across enterprise resources, technologies, and Software as a Service (SaaS)/on-premises applications.

Another prior identity and access management solution involves predefining systems and/or application programs to shut down and restore access entitlements of their users directly on the predefined applications and/or systems. This approach is time consuming because organizations will have to contact individual vendors, SaaS, third-party enterprises, etc. in order to shut down and restore the previously-defined systems and/or applications after each security breach analysis. Further, the effectiveness of this approach is suspect as there is no guarantee that every application, technology, and platform that an enterprise owns will have the ability to perform exclusion/inclusion of populations as part of a shutdown/restore activity during or after a (potential or real) security breach.

In view of the foregoing, there is room for innovations and improvement in identity and access management.

SUMMARY OF THE DISCLOSURE

When a security breach occurs, manually shutting down directory servers and systems operating in an enterprise computing environment is time consuming and costly and does not provide a way to exclude and/or include any particular identity populations in the enterprise computing environment. For example, as alluded to above, there is currently no way to identify and/or separate different populations of identities in a protected computer network. For instance, it is not possible to distinguish an identity population of security officers from an identity population of employees. This means that it is not possible for security officers to perform any security breach analysis while access by the employee population is shut down. Even if selective shut down/restoration of access entitlements could be performed by predefining some systems and/or application programs to do so at the time of a breach, it is still time consuming and inadequate in terms of effectiveness and coverage because such systems and/or application programs would need to be configured by individual vendors, SaaS, third-party providers, etc. in order to shut down when a security breach occurs and then to restore access entitlements after a security breach analysis is performed.

A goal of this disclosure is to provide an emergency identity access shutdown and restore tool that allows identification, configuration, exclusion, and/or inclusion of identity populations in a flexible, effective, efficient, and timely manner so as to avoid or otherwise reduce impact to enterprise operations at the time of a security breach. In embodiments disclosed herein, this goal can be achieved by leveraging certain functionality of an identity and access management (IAM) architecture that provides access to applications and information used by enterprise users.

In some embodiments, a method performed by an emergency shutdown and restore module of an IAM system can include: obtaining, in response to a user instruction or a security breach occurring in an enterprise computing environment, an identity population definition, the identity population definition defining a population of identities in the enterprise computing environment based on a set of attributes of identity management artifacts; determining, based at least on the identity population definition, a set of accounts associated with the population of identities, the set of accounts distributed across applications in the enterprise computing environment; determining source systems of the set of accounts, each of the source systems having a source-specific connector; and requesting, via the source-specific connector respectively, each of the source systems to shut down access to the applications by the set of accounts associated with the population of identities, or to exclude the set of accounts associated with the population of identities in shutting down access to the applications in the enterprise computing environment.

In some embodiments, the identity management artifacts can include at least one of an identity, entitlement, role, event, access profile, or account activity imported or determined from data obtained from a set of source systems within the enterprise computing environment. In some embodiments, the set of attributes can include at least one of an identity or account attribute, source or entitlement information, an existing access right, a job title, an employment identification, location information, or a risk score. In some embodiments, the identity management artifacts are stored in an identity management data store of the IAM system.

In some embodiments, the method performed by the emergency shutdown and restore module can further include providing a user interface for creating or configuring the identity population definition, the identity population definition defined dynamically through the user interface at a time of the security breach occurring in the enterprise computing environment. Alternatively or additionally, in some embodiments, the identity population definition can be predefined through the user interface independently of the security breach occurring in the enterprise computing environment. In some embodiments, the identity population definition can be updated or modified dynamically at the time of the security breach occurring in the enterprise computing environment. In some embodiments, the identity population definition can be stored in an identity management data store accessible by the emergency shutdown and restore module.

In some embodiments, the method performed by the emergency shutdown and restore module can further include requesting, via the source-specific connector respectively, the source systems to restore access to the applications by the set of accounts associated with the population of identities. Alternatively, In some embodiments, the method performed by the emergency shutdown and restore module can further include requesting, via the source-specific connector respectively, the source systems to exclude the set of accounts associated with the population of identities in restoring access to the applications in the enterprise computing environment.

The invention disclosed herein can provide many advantages. For example, the emergency shutdown and restore method disclosed herein can significantly reduce the time it usually takes (e.g., a week or 48 hours, depending on the size of a computer system) to shut down an entire enterprise computing environment to mere seconds. Further, the automated nature of the emergency shutdown and restore method disclosed herein can make a complex shutdown and restore operation significantly less complex and handle a usually lengthy shutdown and restore operation in real time.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE FIGURES

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Figure 1:
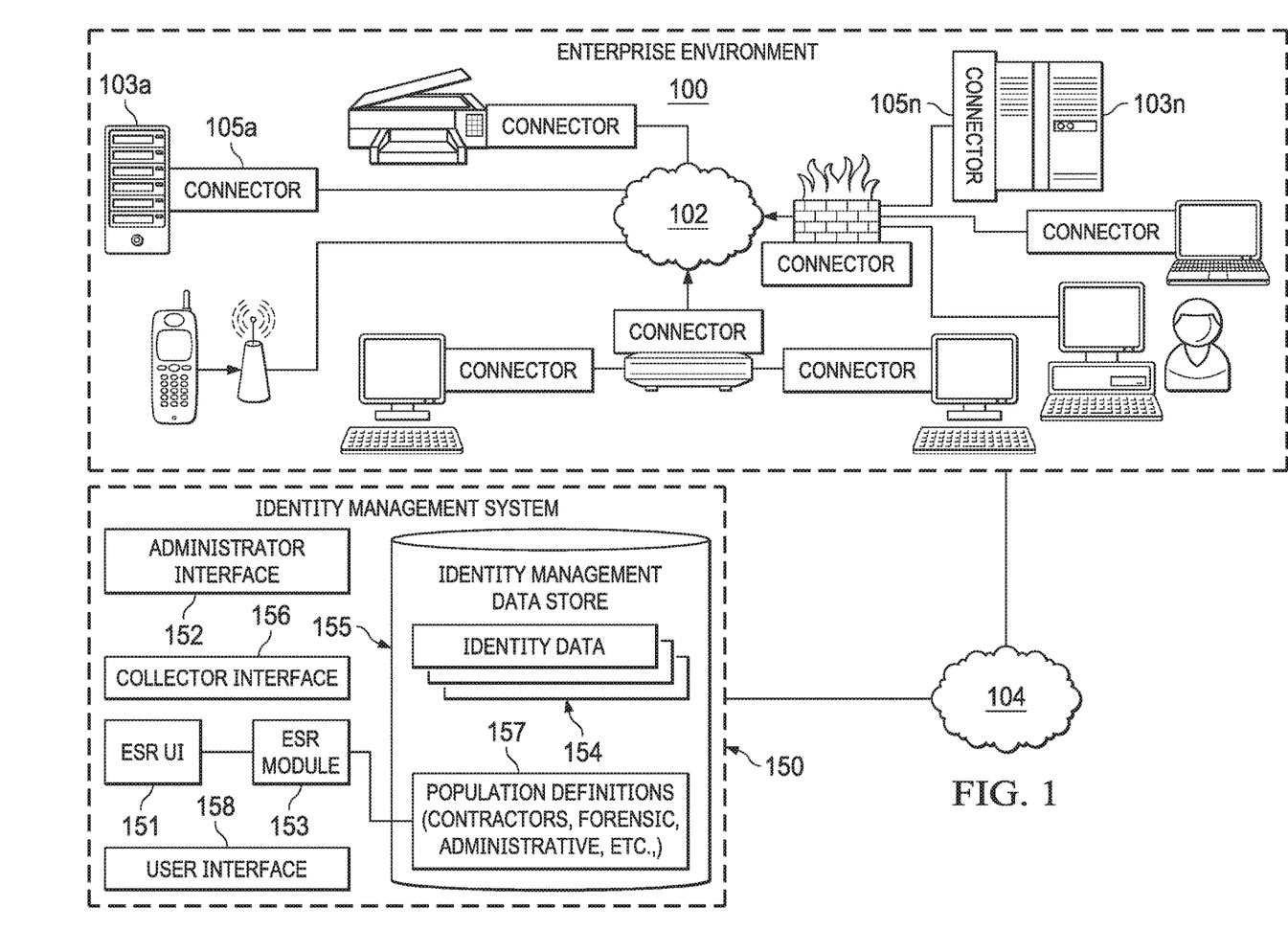
FIG. 1 depicts a diagrammatic representation of a network environment in which embodiments disclosed herein can be implemented.

FIG. 1 depicts a diagrammatic representation of a network environment in which embodiments disclosed herein can be implemented. In this example, the network environment includes an enterprise computing environment 100. Enterprise environment 100 includes a number of computing devices (e.g., source systems 103a . . . 103n) that may be coupled over a computer network 102 or combination of computer networks, such as the Internet, an intranet, an internet, a Wide Area Network (WAN), a Local Area Network (LAN), a cellular network, a wireless or wired network, or another type of network. Enterprise environment 100 may thus include a number of resources (e.g., hardware and software such as enterprise applications), various resource groups and users associated with an enterprise (which, for purposes of this disclosure, can be any for profit or non-profit entity or organization). Users may have various roles, job functions, responsibilities, etc. to perform within various processes or tasks associated with the enterprise. Users can include employees, supervisors, managers, IT personnel, vendors, suppliers, customers, robotic or application based users, etc. associated with the enterprise.

Users associated with the enterprise may access resources of enterprise environment 100 to perform functions associated with their jobs, obtain information about the enterprise and its products, services, and resources, enter or manipulate information regarding the same, monitor activity in enterprise environment 100, order supplies and services for enterprise environment 100, manage inventory, generate financial analyses and reports, or generally to perform any task, activity or process related to the enterprise environment 100. Thus, to accomplish their responsibilities, users may have entitlements to access resources of enterprise environment 100. These entitlements may give rise to risk of negligent or malicious use of resources.

Specifically, to accomplish different functions, different users may have differing access entitlements to differing resources. Some access entitlements may allow particular users to obtain, enter, manipulate, etc. information in resources which may be relatively innocuous. Some access entitlements may allow particular users to manipulate information in resources of enterprise environment 100 which might be relatively sensitive. Some sensitive information can include human resource files, financial records, marketing plans, intellectual property files, etc. Access to sensitive information can allow negligent or malicious activities to harm the enterprise itself. Access risks can thus result from a user having entitlements with which the user can access resources that the particular user should not have access to; gain access to another user's entitlements or for other reasons. Access risks can also arise from roles in enterprise environment 100 which may shift, change, evolve, etc. leaving entitlements non optimally distributed among various users.

In response to regulatory requirements and security access risks and concerns, most enterprises have implemented some form of computer security or access controls. To assist in implementing security measures and access controls in an enterprise environment (e.g., enterprise environment 100), many of these enterprises have implemented Identity Management in association with their distributed networked computer environments. Identity Management solutions allow the definition of a function or an entity associated with an enterprise. An identity may thus be almost physical or virtual thing, place, person or other item that an enterprise would like to define. Identities can therefore be, for example, roles or capacities (e.g., manager, engineer, team leader, etc.), title (e.g., Chief Technology Officer), groups (development, testing, accounting, etc.), processes (e.g., nightly back-up process), physical locations (e.g., cafeteria, conference room), individual users or humans (e.g., John Locke) or almost any other physical or virtual thing, place, person or other item. Each of these identities may therefore be assigned zero or more entitlements with respect to the distributed networked computer environments. An entitlement may be the ability to perform or access a function within the distributed networked computer environments, including, for example, accessing computing systems, applications, file systems, particular data or data items, networks, subnetworks or network locations, etc.

By managing the identity or identities to which users within an enterprise computing environment are assigned, the entitlements which a user may assigned (e.g., the functions or access which a user may be allowed) may be controlled. However, escalating security and privacy concerns are driving governance, access risk management, and compliance to the forefront of Identity Management. To effectively meet the requirements and desires imposed upon enterprises for Identity Management, enterprises may be required to prove that they have strong and consistent controls over who has access to critical applications and data.

Yet many companies still struggle with how to focus compliance efforts to address actual risk in what usually is a complex, distributed networked computing environment. Decisions about which access entitlements are desirable to grant a particular user are typically based on the roles that the user plays within the organization. In large organizations, granting and maintaining user access entitlements is a difficult and complex process, involving decisions regarding whether to grant entitlements to thousands of users and hundreds of different applications and databases. This complexity can be exacerbated by high employee turnover, reorganizations, and reconfigurations of the various accessible systems and resources.

In the example of FIG. 1, an identity management system 150 may be employed to assist in managing the entitlements assigned to various users and more generally in managing and assessing access risks in enterprise environment 100. Such an identity management system 150 may allow an administrative or other type of user to define one or more identities and one or more entitlements and associate these identities with entitlements using, for example, an administrator interface 152. Examples of such identity management systems are Sailpoint's IdentityIQ and IdentityNow products. Note here, that while the identity management system 150 has been depicted in the diagram as separate and distinct from the enterprise environment 100 and coupled to enterprise environment 100 over a computer network 104 (which can be the same as, or different than, network 102), it will be realized that such an identity management system 150 may be deployed as part of the enterprise environment 100, remotely from the enterprise environment, as a cloud based application or set of services, or in another configuration.

An identity can thus be almost any physical or virtual thing, place, person or other item that an enterprise would like to define. For example, an identity may be a role or capacity, title, groups, processes, physical locations, individual users or humans or almost any other physical or virtual thing, place, person or other item. An entitlement may be the ability to perform or access a function within the distributed networked enterprise computer environment 100, including, for example, accessing computing systems, applications, file systems, particular data or data items, networks, subnetworks or network locations, etc. Each of these identities can, for instance, be assigned zero or more entitlements with respect to the distributed networked computer environments.

In some embodiments, an identity management data store 155 can store identity management data 154 obtained from one or more identity management systems that are deployed in association with enterprise environment 100. Although FIG. 1 depicts a single identity management system for purposes of explanation and illustration, it will be apparent that the functions of the identity management system 150 can be distributed across multiple identity management systems as necessary or desired. Accordingly, the identity management data 154 may be obtained as part of a regular collection or harvesting process performed at some regular interval by connecting to, and requesting the identity management data 154 from, one or more identity management systems. The identity management data 154 may also be obtained on a one-time or user initiated basis.

The identity management data 154 may include a set of entries, each entry corresponding to and including an identity (e.g., alphanumerical identifiers for identities) as defined and managed by the identity management system 150, a list or vector of entitlements assigned to that identity by the identity management system 150, and a time stamp at which the identity management data 154 was collected.

Other data could also be associated with each identity, including data that may be provided from other systems such as a title, location or department associated with the identity.

For instance, in some embodiments, an identity can be associated with a population per a population definition that defines a set of identity attributes based on artifacts of the identity management system 150. As a non-limiting example, an identity can be in a contractor population due to the identity's role or capacity as a contractor. As another non-limiting example, an identity can be in a forensic population per a title of the identity as a network security analyst. As yet another non-limiting example, an identity can be in an administrative population due to the identity's entitlement or ability to perform or access a function within enterprise environment 100.

As alluded to above, generally, during security breaches, enterprise entities such as organizations and companies do not have any quick and easy way to shut down all access or subset of access of their identities to perform/detect security analysis. As a result, enterprises have to unplug their systems and doing so can lead to downtime for system operations. Further, it takes a lot of time to bring systems back up and that, in turn, is expensive, inefficient, and wasteful. Also, once a security breach analysis is performed, there is no easy way to restore access of identities across enterprise resources, technologies, and SaaS/On-premises applications quickly.

To this end, the identity management system 150 is enhanced with the ability to perform emergency shutdown and restore operations that can shut down and restore access of identities during and after security breaches. In some embodiments, this ability is made possible per the above-discussed population definition that defines a set of identity attributes based on artifacts of the identity management system 150.

Figure 2:
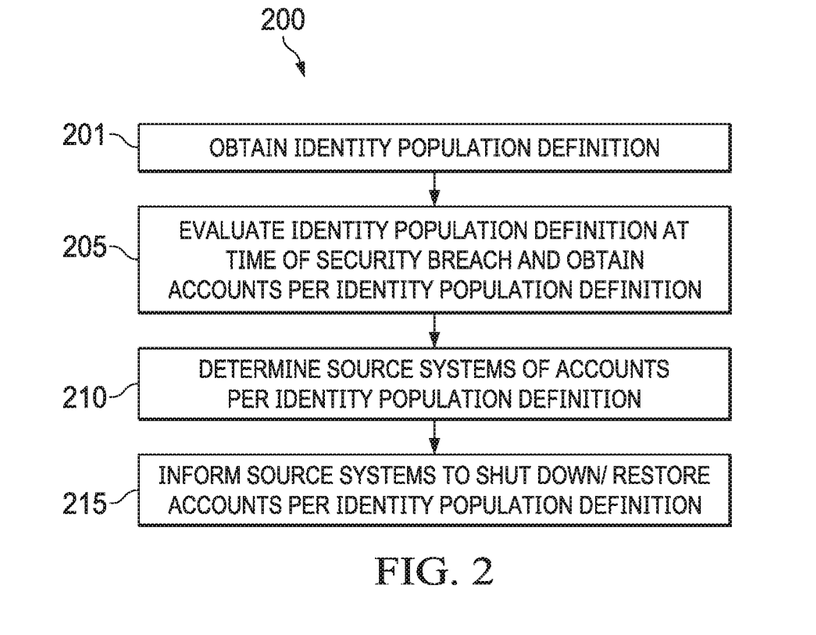
FIG. 2 is a flow chart showing an emergency shutdown and restore method according to some embodiments disclosed herein.

Particularly, referring to FIG. 1 and FIG. 2, in some embodiments, a method 200 performed by an emergency shutdown and restore module 153 of the identity management system 150 can include: obtaining, in response to a user instruction or a security breach occurring in enterprise environment 100, an identity population definition (201). The identity population definition defines a population of identities in enterprise environment 100 based on a set of attributes of identity management artifacts of the identity management system 150.

Examples of identity management artifacts can include, but are not limited to, an identity, entitlement, application, account, role, event, policy, group, permission, user, owner, source, configuration, organization, violation, governance group, access profile or account activity. In some embodiments, there may be a document for each artifact (e.g., identity, entitlement, role, event, access profile, account activity, etc.) associated with enterprise environment 100. In certain embodiments, these documents formed according to a nested denormalized document model may be nested documents. That is, a document for an identity management artifact (e.g., such as an identity, role, event, etc.) may include, as a nested or child document, documents for related identity management artifacts, even in instances where documents for those related identity management artifacts may be separately stored and indexed in the identity management data store 155 (e.g., as top level, root, or parent documents).

As a non-limiting example of identity management data 154, the following is one example of a Javascript Object Notation (JSON) object that may relate to an identity:

```
{
  "attributes": {
     "Department": "Finance",
     "costcenter": "[RO1e, L03]",
     "displayName": "Catherine Simmons",
     "email": "Catherine.Simmons@demoexample.com",
     "empId": "1b2c3d",
     "firstname": "Catherine",
     "inactive": "false",
     "jobtitle": "Treasury Analyst",
     "lastname": "Simmons",
     "location": "London",
     "manager": "Amanda.Ross",
     "region": "Europe",
     "riskScore": 528,
     "startDate": "12/31/2016 00:00:00AM UTC",
     "nativeIdentity_source_2": "source_2",
     "awesome_attribute_source_1": "source_1",
     "twin_attribute_a": "twin a",
     "twin_attribute_b": "twin b",
     "twin_attribute_c": "twin c"
  },
  "id": "2c9084ee5a8de328015a8de370100082",
  "integration_id": "iiq",
  "customer_id": "ida-bali",
  "meta": {
     "created": "2017-03-02T07:19:37.233Z",
     "modified": "2017-03-02T07:24:12.024Z"
  },
  "name": "Catherine.Simmons",
  "refs": {
    "accounts": {
     "id": [
        "2c9084ee5a8de328015a8de370110083"
     ],
     "type": "account"
    },
    "tags": [
        {
          "id": "2c9084ee5a8ad545345345a8de370110083"
          "name": "SOD-SOX",
          "type": "TAG"
        },
        {
          "id": "2c9084ee5a8ad545345345a8de370122093"
          "name" : "PrivilegedAccess",
          "type": "TAG"
        },
    ]
    "entitlements": {
        "id": [
          "2c9084ee5a8de328015a8de449060e54",
          "2c9084ee5a8de328015a8de449060e55"
        ],
        "type": "entitlement"
    },
    "manager": {
        "id":
          "2c9084ee5a8de022015a8de0c52b031d"
        ],
        "type": "identity"
    }
  },
  "type": "identity"
}
```

As another example of identity management data 154, the following is one example of a JSON object that may relate to an entitlement:

```
{
  "integration_id": "bd992e37-bbe7-45ae-bbbf-c97a59194cbc",
  "refs": {
     "application": {
     "id": [
        "2c948083616ca13a01616ca1d4aa0301"
     ],
     "type": "application"
```

```
        }
    },
    "tags": [
        {
            "id": "2c9084ee5a8ad545345345a8de370110083"
            "name": "SOD-SOX",
            "type": "TAG"
        },
        {
            "id": "2c9084ee5a8ad545345345a8de370122093"
            "name": "PrivilegedAccess",
            "type": "TAG"
        },
    ]
    "meta": {
        "created": "2018-02-06T19:40:08.005Z",
        "modified": "2018-02-06T19:40:08.018Z"
    },
    "name": "Domain Administrators",
    "attributes": {
        "description": "Domain Administrators group on Active Directory",
        "attribute": "memberOf",
        "aggregated": true,
        "requestable": true,
        "type": "group",
        "value": "cn=Domain Administrators,dc=domain,dc=local"
    },
    "id": "2c948083616ca13a01616ca1f1c50377",
    "type": "entitlement",
    "customer_id": "3a60b474-4f43-4523-83d1-eb0fd571828f"
}
```

Other examples can be found in U.S. Patent Application Publication No. US 2020/0396312 A1, entitled "SYSTEM AND METHOD FOR TAGGING IN IDENTITY MANAGEMENT ARTIFICIAL INTELLIGENCE SYSTEMS AND USES FOR SAME, INCLUDING CONTEXT BASED GOVERNANCE," which is fully incorporated by reference herein.

In some embodiments, method 200 further includes determining, based at least on the identity population definition, a set of accounts associated with the population of identities per the identity population definition (205). This determination is performed by applying the identity population definition to the current identity management data during or after the security breach. This is because identity management data (i.e., identity management system artifacts such as entitlement, application, account, role, event, policy, group, permission, user, owner, source, configuration, organization, violation, governance group, access profile, account activity, etc.) could change over time. By evaluating the identity population definition against the current identity management data at the time of the security breach (i.e., during or after the security breach), method 200 can ensure the accuracy of the set of accounts thus determined as being associated with the identity population definition at the time of the security breach.

As illustrated in FIG. 1, the set of accounts can be distributed across applications in enterprise environment 100. Accordingly, in some embodiments, method 200 further includes determining source systems (e.g., source systems 103a . . . 103n) of the set of accounts (210). In some embodiments, the identity management artifacts can include at least one of an identity, entitlement, role, event, access profile, or account activity imported or determined from data obtained from a set of source systems (e.g., source systems 103a . . . 103n) within enterprise environment 100. In some embodiments, the set of attributes can include at least one of an identity or account attribute, source or entitlement information, an existing access right, a job title, an employment identification, location information, or a risk score.

As exemplified in FIG. 1, each of the source systems 103a . . . 103n can have a source-specific connector, respectively (e.g., connectors 105a . . . 105n). Through the respective source-specific connectors, the emergency shutdown and restore module 153 can request the respective source systems to shut down and/or restore access to the applications by the set of accounts associated with the population of identities, or to exclude the set of accounts associated with the population of identities in shutting down and/or restoring access to the applications in enterprise environment 100 (215). These "break glass" operations are further discussed below.

Likewise, through the respective source-specific connectors, collectors 156 of the identity management system 150 can request or otherwise obtain data from various touchpoint systems within enterprise environment 100. These touchpoint systems can include, for example, Active Directory systems, Java Database Connectors within the enterprise 100, Microsoft SQL servers, Azure Active Directory servers, OpenLDAP servers, Oracle Databases, SalesForce applications, ServiceNow applications, SAP applications or Google GSuite, and so on.

The collectors 156 of the identity management system 150 may obtain or collect event data from various systems within enterprise environment 100 and process the event data to associate the event data with the identities defined in the identity management data 154 to evaluate or analyze these events or other data in an identity management context. In one embodiment, the identity management data 154 can be stored in a cube (e.g., "Identity Cube") where all identity management data 154 associated with a particular artifact (e.g., for an identity all of their accounts from all data sources, and all attributes and entitlements of those accounts) may be associated. The Identity Cube, identity or account attributes, and identity management artifacts are further discussed in the above-referenced U.S. patent application Ser. No. 16/440,690, filed on Jun. 13, 2019, which is fully incorporated by reference herein.

Figure 5:
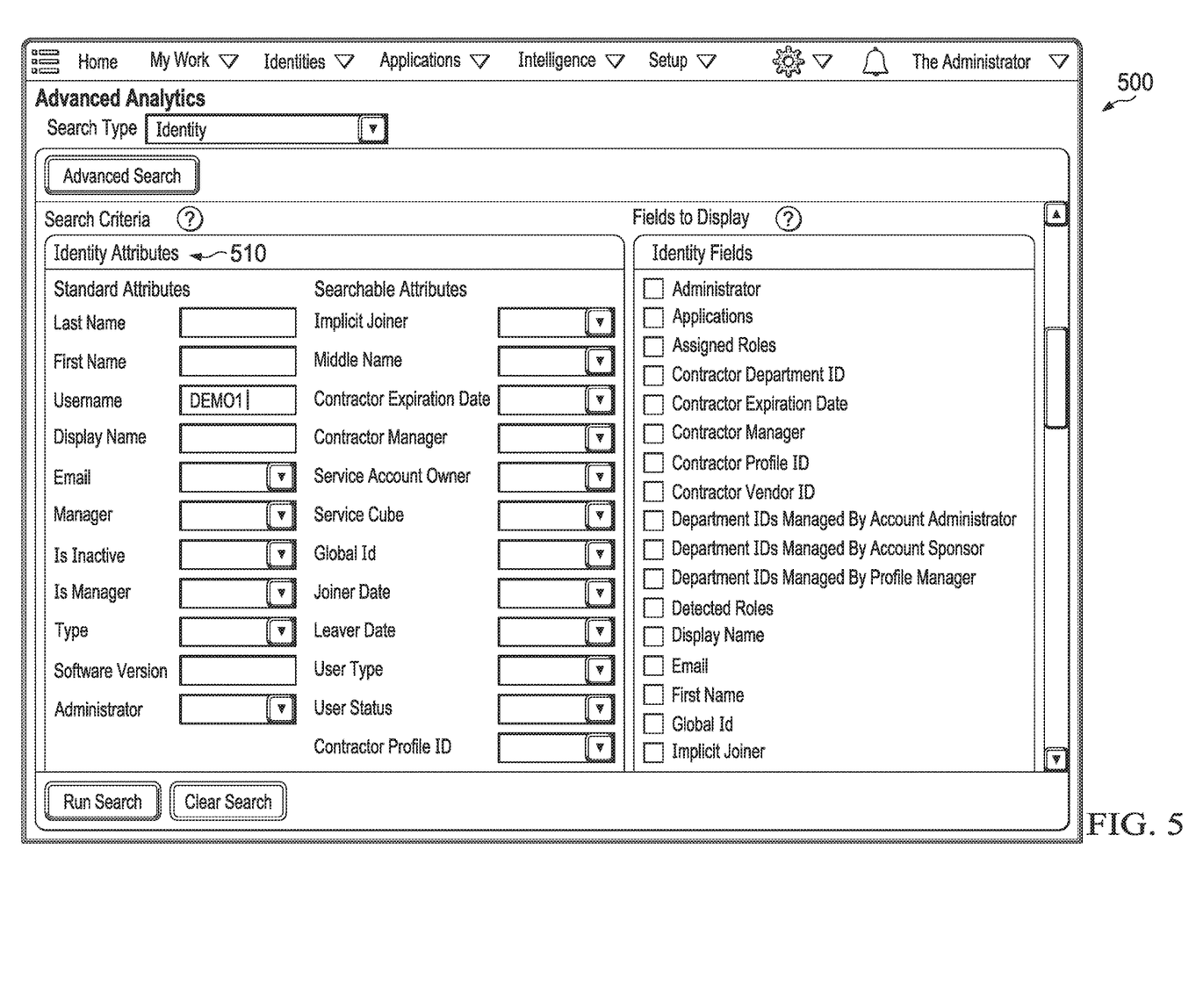
FIG. 5 depicts a diagrammatic representation of an example of a user interface of an Identity and Access Management system showing examples of searchable identity attributes according to some embodiments disclosed herein.

A user may interact with the identity management system 150 through a user interface 158 to access or manipulate data on identities, entitlements, events or generally identity management with respect to enterprise environment 100. An example is illustrated in FIG. 5, which depicts a diagrammatic representation of a user interface 500 showing examples of searchable identity attributes 510 according to some embodiments disclosed herein. An example of a search system that utilizes data included in, or derived from the identity management data 154 can be found the above-referenced U.S. patent application Ser. No. 16/440,690, filed on Jun. 13, 2019, which is fully incorporated by reference herein.

In some embodiments, a population definition can be predefined and/or configured independently of any security breach occurring in enterprise environment 100. The identity management system 150 can store a predefined identity definition 157 in an identity management data store 155. In some embodiments, a population definition can be defined and/or updated dynamically at a time of, or shortly after, a security breach occurring in enterprise environment 100.

In some embodiments, creation and/or modification of a population definition (dynamic or predefined) can be accomplished through an emergency shutdown and restore user interface 151 of an emergency shutdown and restore module 153. An example is illustrated in FIG. 3, which depicts a diagrammatic representation of an example of a user interface 300 through which an emergency shutdown and restore tool is accessible according to some embodiments disclosed herein.

As explained above, the emergency shutdown and restore module 153 can access the identity management data store 155 per an instruction (e.g., from an authorized user such as an administrator or network security officer) or automatically programmatically in response to a security breach in enterprise environment 100 and retrieve a predefined population definition 157. Because the identity management data 154 such as identity management system artifacts could change over time, the emergency shutdown and restore module 153 can be adapted to evaluate a predefined population definition 157 and determine a set of accounts defined by the predefined population definition 157 based on the current identity management data 154 stored in the identity management data store 155. Alternatively, the emergency shutdown and restore module 153 can be adapted to provide an authorized user with the ability to create and/or specify a population definition dynamically.

Figure 3:
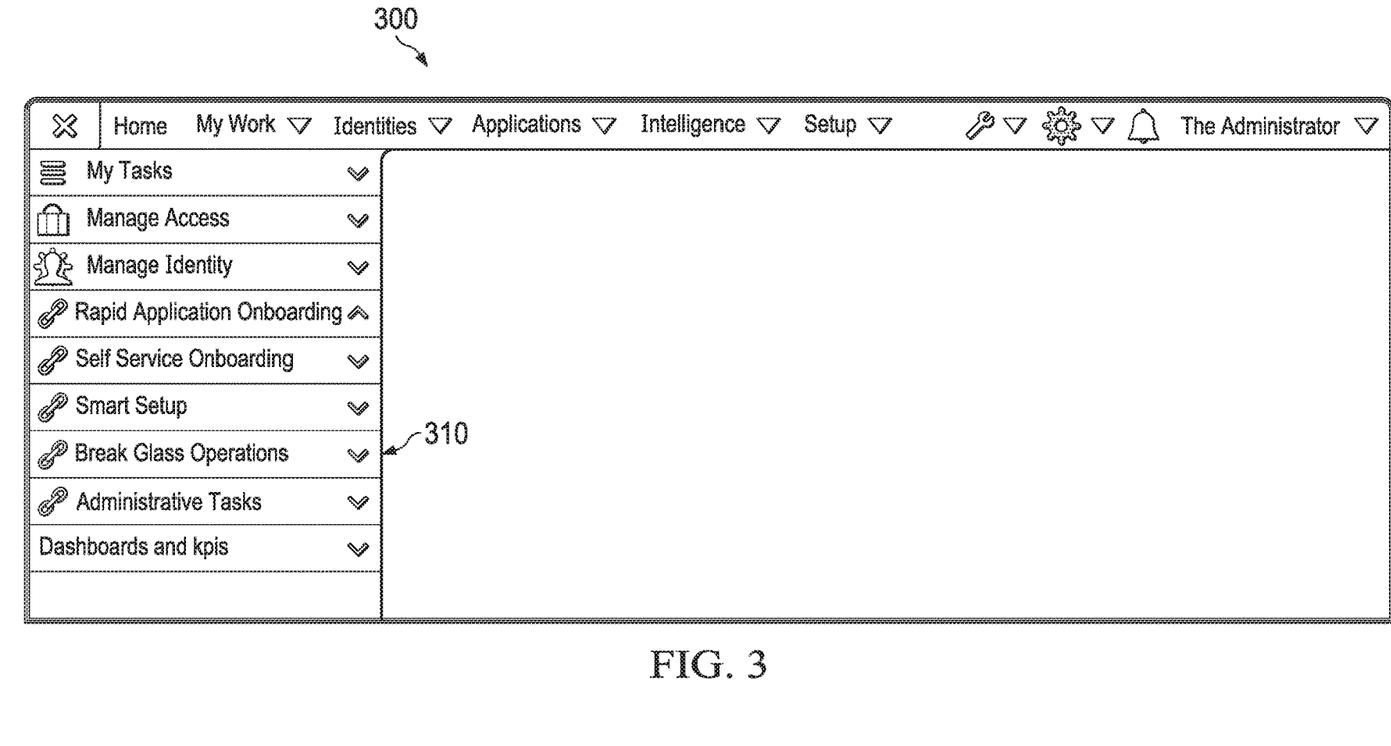
FIG. 3 depicts a diagrammatic representation of an example of a user interface of an Identity and Access Management system according to some embodiments disclosed herein.

As illustrated in FIG. 3, the user interface 300 of an Identity and Access Management system is enhanced with a new emergency shutdown and restore tool accessible through break glass operations 310. FIGS. 4A-4F depict diagrammatic representations of an example of a user interface of an emergency shutdown and restore tool 400 illustrating example functionalities thereof according to some embodiments disclosed herein.

Figure 4A:
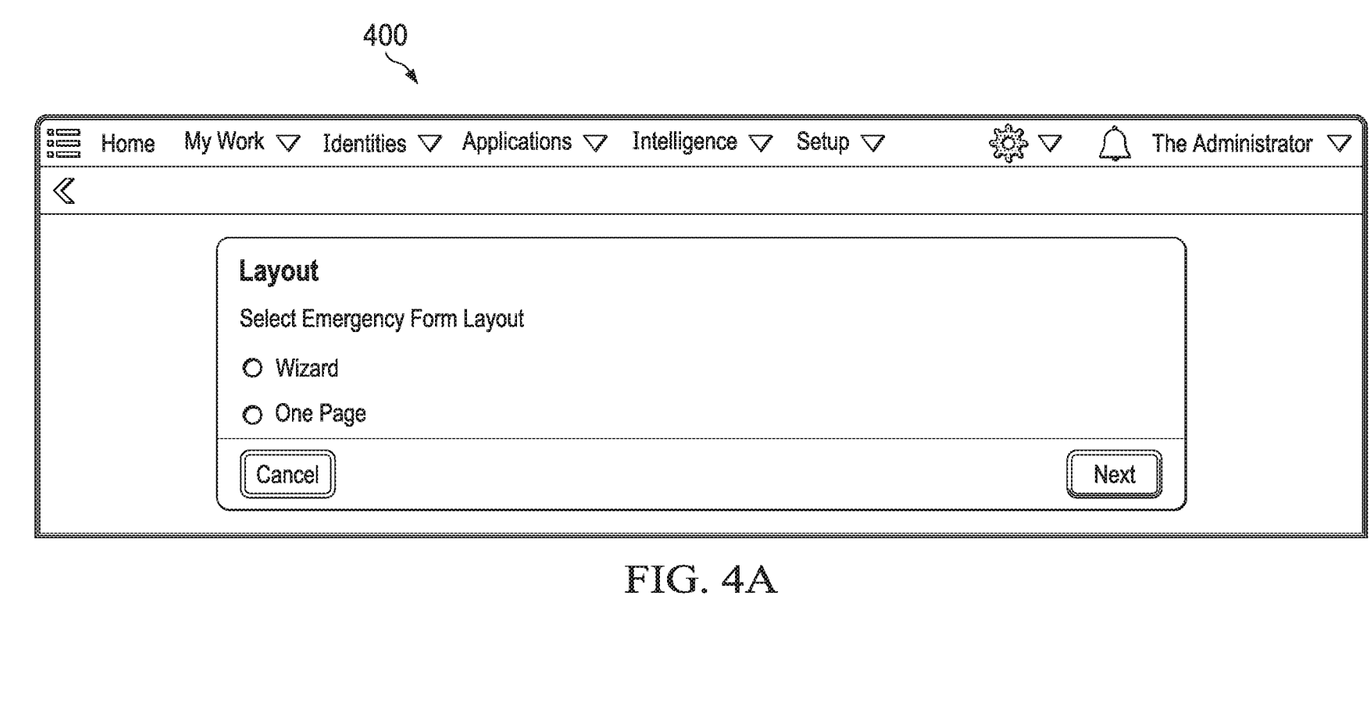
FIGS. 4A-4F depict diagrammatic representations of an example of a user interface of an emergency shutdown and restore tool according to some embodiments disclosed herein.

As shown in FIG. 4A, the emergency shutdown and restore tool 400 enables a user to navigate its functionalities through a wizard widget or a scrollable form page. Responsive to the wizard widget being selected, the emergency shutdown and restore tool 400 can programmatically guide the user in configuring the break glass operations 310 step by step. In some embodiments, the emergency shutdown and restore tool is accessible by only a few selected administrative security officers in an enterprise computing environment. The functionalities the emergency shutdown and restore tool 400 will now be described with reference to FIG. 4B (Suspend/Restore Access), FIG. 4C (Identity Population and Access Shutdown), FIG. 4D (Vertical Auto Scaling), FIG. 4E (Provisioning Channel), and FIG. 4F (Request Processor).

Figure 4B:
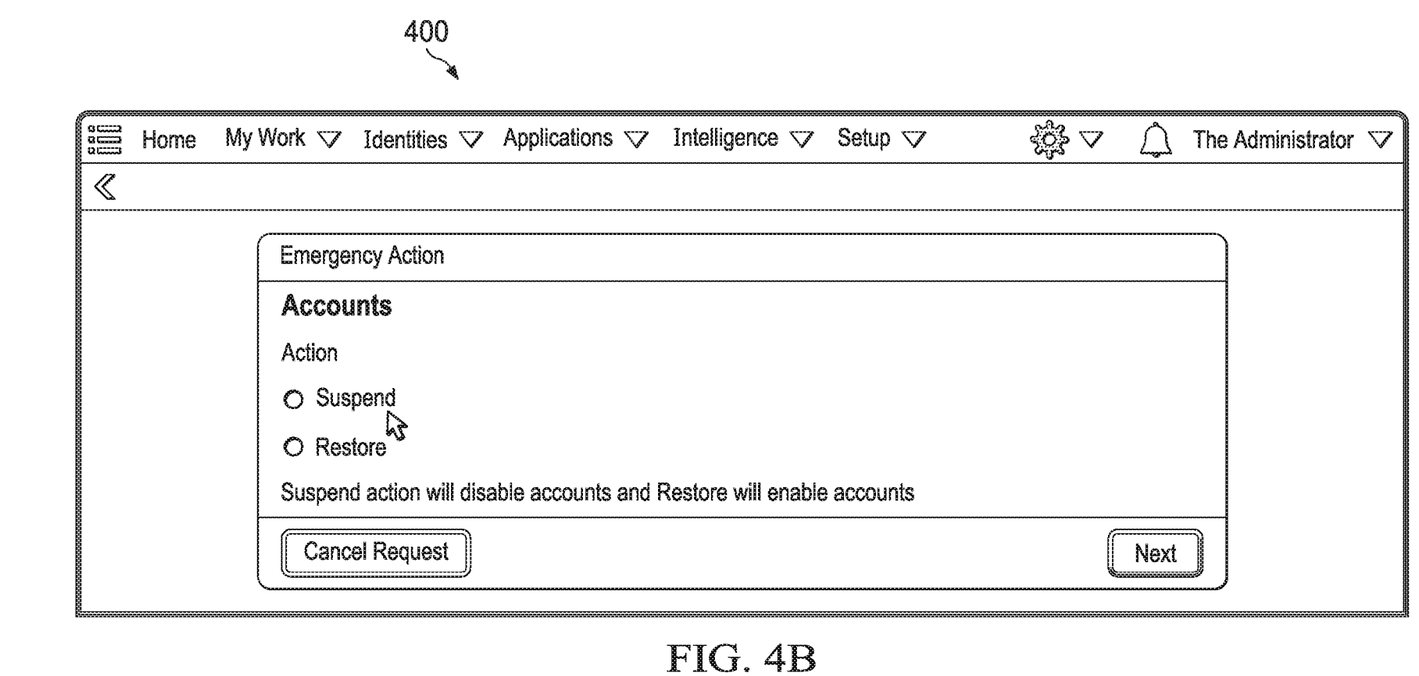

FIG. 4B shows two types of emergency actions—"suspend" or "restore" in which accounts in an enterprise computing environment are to be suspended or restored. The "suspend" action will disable the accounts. Disabling an account means that the account will not be able to access its source system. The suspend operation can be selected to shut down access. The "restore" action will restore the accounts and thus bring access back.

Figure 4C:
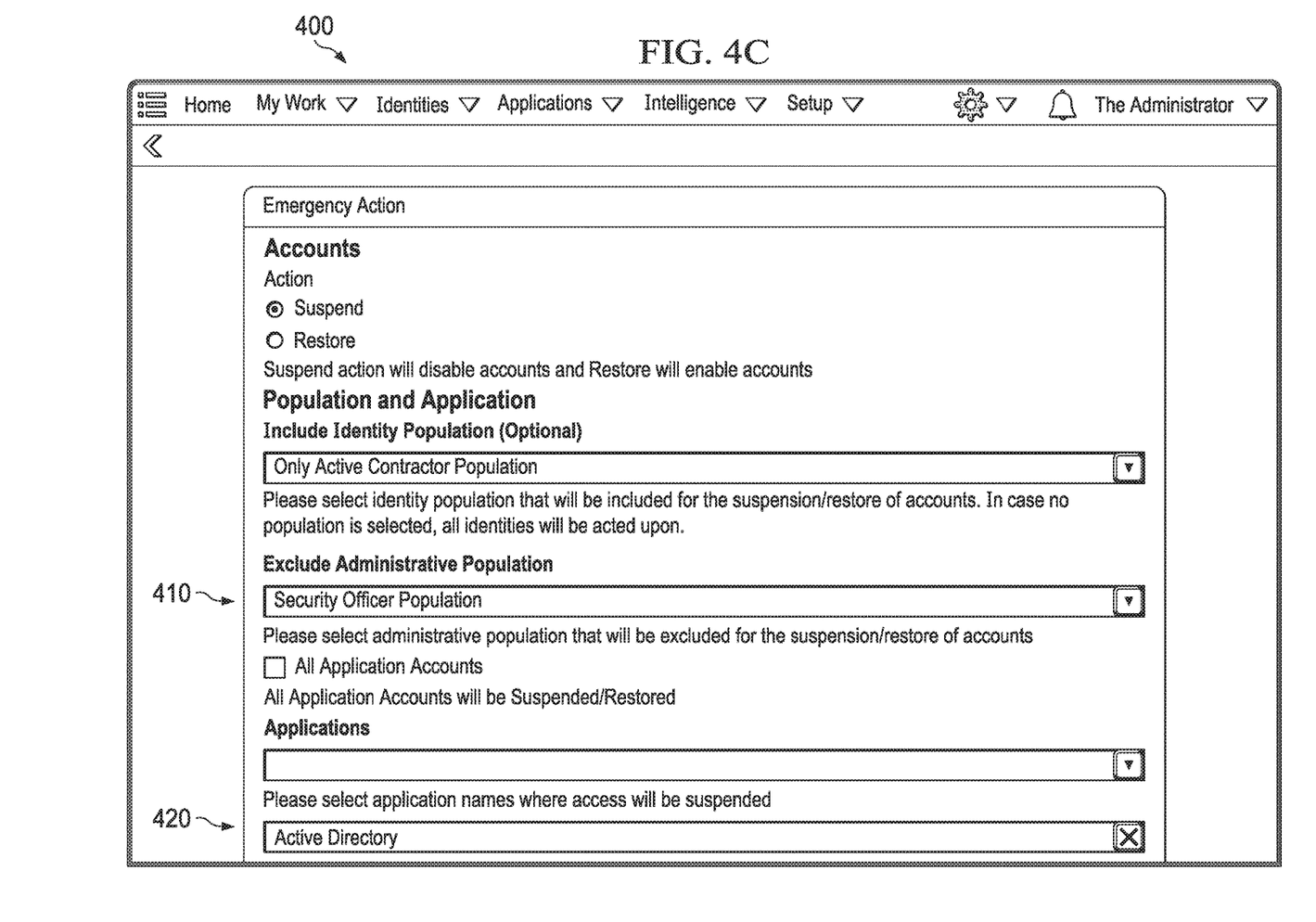

FIG. 4C shows that targeted identity populations can be selected for analysis. For instance, the "Only Active Contractor Population" can be specifically included in a restore. Further, an administrative population (e.g., a security officer population 410) can be excluded from the "suspend" action. In some cases, all connected and aggregated applications will be suspended by default. However, federated/enterprise directories such as "Active Directory" can be selected to perform suspension of accounts during a security breach, with the exception of the administrative population. This allows an administrator or administrators to investigate and perform a breach analysis.

This emergency shutdown and restore process can be launched multiple times, either at the same time or at different times for various populations. For example, it can be launched either parallelly (e.g., shutting down accounts associated with identities in the Guest and Contractor populations) in parallel or sequentially multiple times (e.g., first shutting down accounts associated with identities in the Guest population and the shutting down accounts associated with identities in the Contractor population).

The "suspend" action can be used to suspend access entitlements of identities in bulk (e.g., "All Application Accounts" or an entire population such as "Only Active Contractor Population" with respect to an application 420 such as "Active Directory"). Likewise, the "restore" action can be used to restore access entitlements of identities in bulk.

Figure 4D:
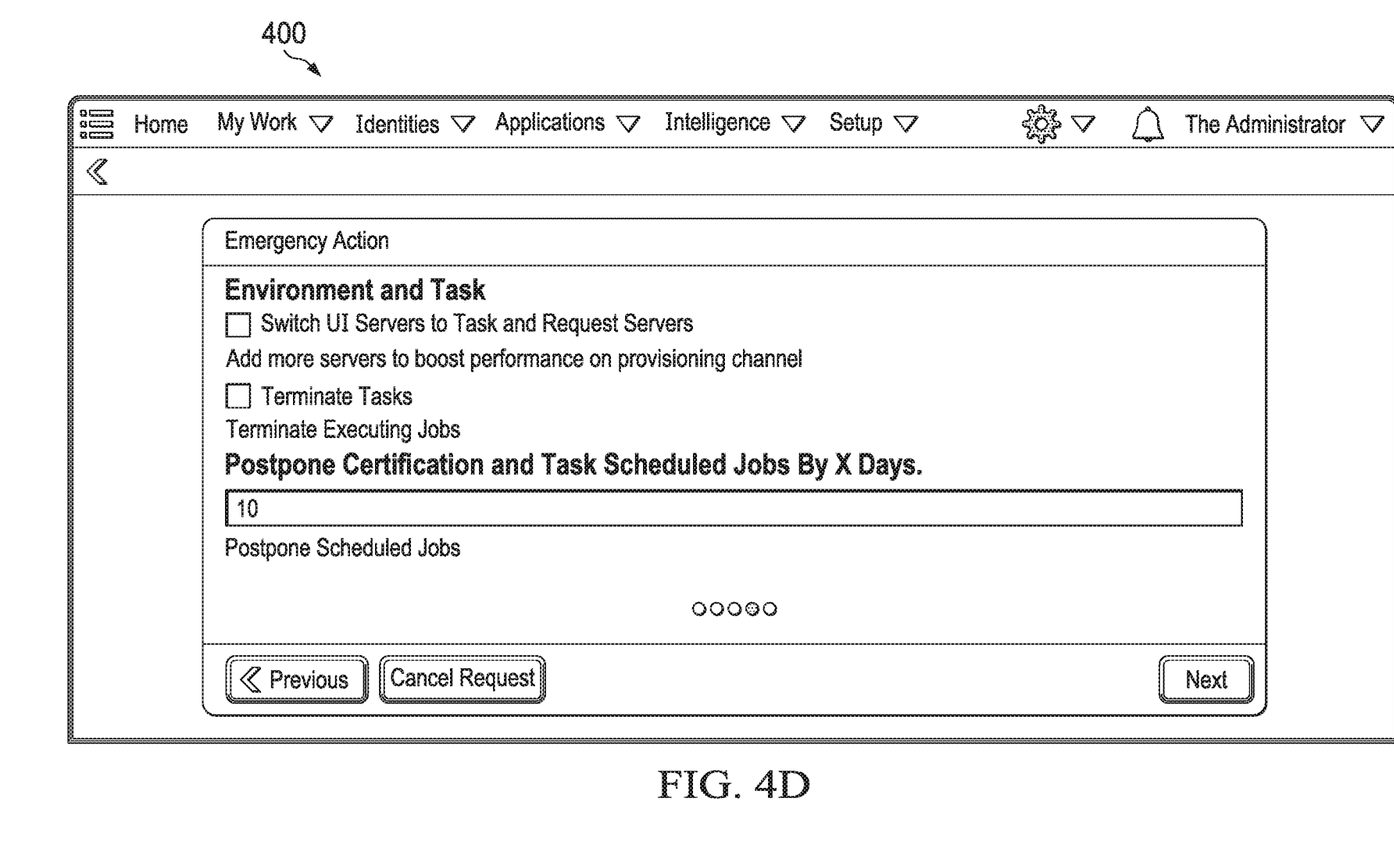

FIG. 4D shows that the emergency shutdown and restore tool 400 allows to auto scale IdentityIQ servers to perform faster suspend/restore operations on the applications. Also, it provides capabilities to shut down any scheduled or executing tasks. This is to ensure utilization of all the available computing capabilities to perform suspension/restore operations on applications.

Figure 4E:
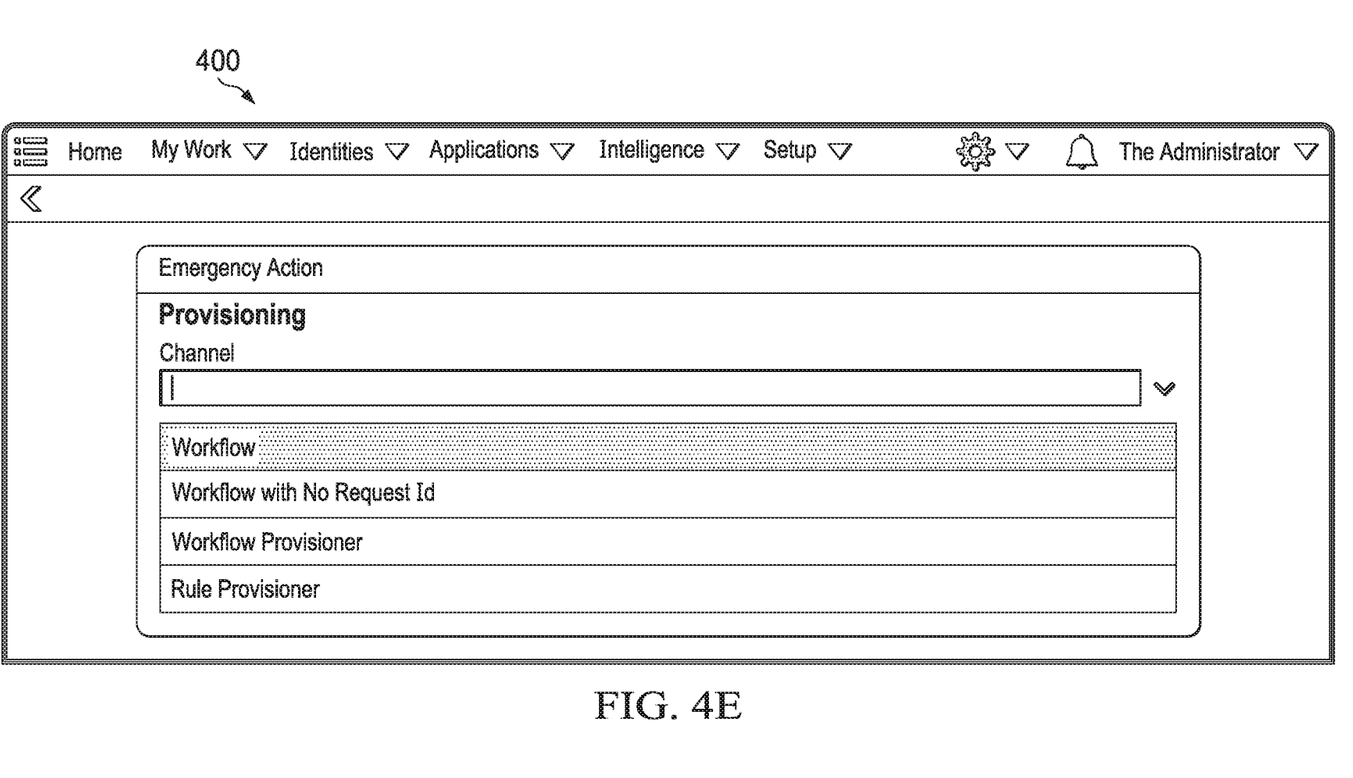

FIG. 4E shows that multiple channels can be used to suspend/restore accounts on applications for provisioning purposes. In this case, every channel provides different set of capabilities. Example channels are listed below in order of computing/provisioning speed according to some embodiments.

Workflow: This channel provides auditing and traceability feature on each application provisioning.

Workflow with No Request Id: This channel provides only the provisioning auditing feature on each application provisioning.

Workflow Provisioner: This channel provides only the provisioning auditing feature on each application provisioning.

Rule Provisioner: This channel provides only the provisioning auditing feature on each application provisioning.

Connector Provisioner: This channel provides the fastest provisioning capability.

Figure 4F:
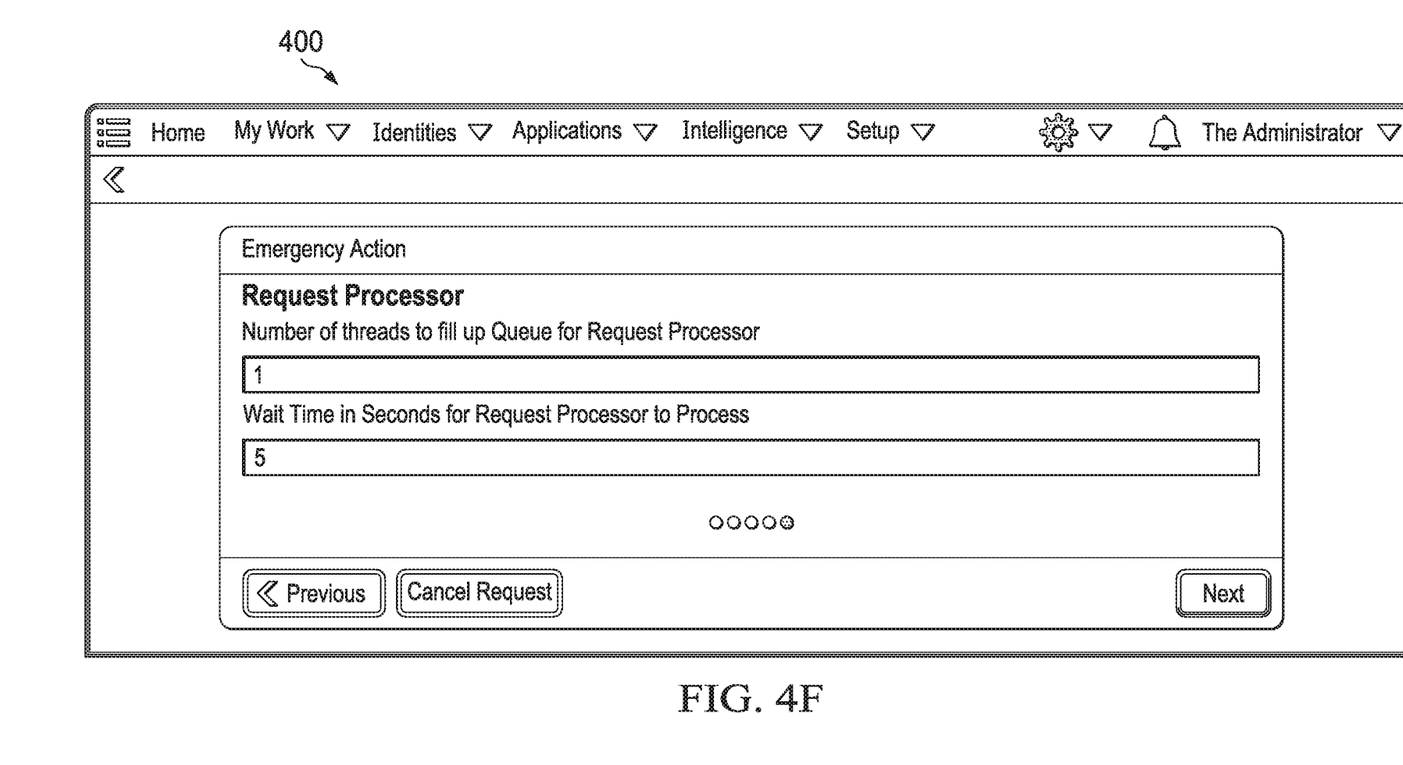

FIG. 4F shows that a request processor can be used to vertically scale servers to add more computing threads and processors. In this way, embodiments as disclosed may offer the technological improvement of reducing the computational burden and memory requirements of systems implementing these embodiments. Further, in conjunction with the provisioning channels and vertical scaling of computing threads and processors, embodiments may improve the performance and responsiveness of identity management systems by reducing the computation time and processor cycles required (e.g., and thus improving processing speed).

Those skilled in the relevant art will appreciate that the invention can be implemented or practiced with other computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer-readable medium, hardware circuitry or the like, or any combination and that may be translatable by one or more server machines. Examples of a non-transitory computer-readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods or programs of embodiments of the invention described herein, including R, Python, C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

What is claimed is:

1. A method, comprising:
obtaining, by an emergency shutdown and restore module in response to a user instruction or a security breach occurring in an enterprise computing environment, an identity population definition, the identity population definition defining a population of identities in the enterprise computing environment based on a set of attributes of identity management artifacts;
determining, by the emergency shutdown and restore module based at least on the identity population definition, a set of accounts associated with the population of identities, the set of accounts distributed across applications in the enterprise computing environment;
determining, by the emergency shutdown and restore module, source systems of the set of accounts, each of the source systems having a source-specific connector; and
requesting, by the emergency shutdown and restore module via the source-specific connector respectively, each of the source systems to shut down access to the applications by the set of accounts associated with the population of identities, or to exclude the set of accounts associated with the population of identities in shutting down access to the applications in the enterprise computing environment.

2. The method according to claim 1, wherein the identity management artifacts comprise at least one of an identity, entitlement, role, event, access profile, or account activity imported or determined from data obtained from a set of source systems within the enterprise computing environment.

3. The method according to claim 1, wherein the set of attributes comprises at least one of an identity or account attribute, source or entitlement information, an existing access right, a job title, an employment identification, location information, or a risk score.

4. The method according to claim 1, wherein the identity management artifacts are stored in an identity management data store of an identity management system and wherein the identity management system comprises the emergency shutdown and restore module.

5. The method according to claim 1, further comprising:
providing a user interface for creating or configuring the identity population definition, wherein the identity population definition is defined dynamically through the user interface at a time of the security breach occurring in the enterprise computing environment.

6. The method according to claim 1, further comprising:
providing a user interface for creating or configuring the identity population definition, wherein the identity population definition is predefined through the user interface independently of the security breach occurring in the enterprise computing environment; and
storing the identity population definition in an identity management data store accessible by the emergency shutdown and restore module.

7. The method according to claim 1, further comprising:
requesting, by the emergency shutdown and restore module via the source-specific connector respectively, each of the source systems to restore access to the applications by the set of accounts associated with the population of identities, or to exclude the set of accounts associated with the population of identities in restoring access to the applications in the enterprise computing environment.

8. An emergency shutdown and restore system, comprising:
a processor;
a non-transitory computer-readable medium; and
stored instructions translatable by the processor for:
obtaining, in response to a user instruction or a security breach occurring in an enterprise computing environment, an identity population definition, the identity population definition defining a population of identities in the enterprise computing environment based on a set of attributes of identity management artifacts;
determining, based at least on the identity population definition, a set of accounts associated with the population of identities, the set of accounts distributed across applications in the enterprise computing environment;
determining source systems of the set of accounts, each of the source systems having a source-specific connector; and
requesting, via the source-specific connector respectively, each of the source systems to shut down access to the applications by the set of accounts associated with the population of identities, or to exclude the set of accounts associated with the population of identities in shutting down access to the applications in the enterprise computing environment.

9. The emergency shutdown and restore system of claim 8, wherein the identity management artifacts comprise at least one of an identity, entitlement, role, event, access profile, or account activity imported or determined from data obtained from a set of source systems within the enterprise computing environment.

10. The emergency shutdown and restore system of claim 8, wherein the set of attributes comprises at least one of an identity or account attribute, source or entitlement information, an existing access right, a job title, an employment identification, location information, or a risk score.

11. The emergency shutdown and restore system of claim 8, wherein the identity management artifacts are stored in an identity management data store of an identity management system and wherein the identity management system comprises the emergency shutdown and restore system.

12. The emergency shutdown and restore system of claim 8, wherein the stored instructions are further translatable by the processor for:
providing a user interface for creating or configuring the identity population definition, wherein the identity population definition is defined dynamically through the user interface at a time of the security breach occurring in the enterprise computing environment.

13. The emergency shutdown and restore system of claim 8, wherein the stored instructions are further translatable by the processor for:
providing a user interface for creating or configuring the identity population definition, wherein the identity population definition is predefined through the user interface independently of the security breach occurring in the enterprise computing environment; and storing the identity population definition in an identity management data store accessible by the emergency shutdown and restore system.

14. The emergency shutdown and restore system of claim 8, wherein the stored instructions are further translatable by the processor for:

requesting, via the source-specific connector respectively, each of the source systems to restore access to the applications by the set of accounts associated with the population of identities, or to exclude the set of accounts associated with the population of identities in restoring access to the applications in the enterprise computing environment.

15. A computer program product for emergency shutdown and restore, the computer program product comprising a non-transitory computer-readable medium storing instructions translatable by a processor for:

obtaining, in response to a user instruction or a security breach occurring in an enterprise computing environment, an identity population definition, the identity population definition defining a population of identities in the enterprise computing environment based on a set of attributes of identity management artifacts;

determining, based at least on the identity population definition, a set of accounts associated with the population of identities, the set of accounts distributed across applications in the enterprise computing environment;

determining source systems of the set of accounts, each of the source systems having a source-specific connector; and requesting, via the source-specific connector respectively, each of the source systems to shut down access to the applications by the set of accounts associated with the population of identities, or to exclude the set of accounts associated with the population of identities in shutting down access to the applications in the enterprise computing environment.

16. The computer program product of claim 15, wherein the identity management artifacts comprise at least one of an identity, entitlement, role, event, access profile, or account activity imported or determined from data obtained from a set of source systems within the enterprise computing environment.

17. The computer program product of claim 15, wherein the set of attributes comprises at least one of an identity or account attribute, source or entitlement information, an existing access right, a job title, an employment identification, location information, or a risk score.

18. The computer program product of claim 15, wherein the instructions are further translatable by the processor for:

providing a user interface for creating or configuring the identity population definition, wherein the identity population definition is defined dynamically through the user interface at a time of the security breach occurring in the enterprise computing environment.

19. The computer program product of claim 15, wherein the instructions are further translatable by the processor for:

providing a user interface for creating or configuring the identity population definition, wherein the identity population definition is predefined through the user interface independently of the security breach occurring in the enterprise computing environment; and storing the identity population definition in an identity management data store.

20. The computer program product of claim 15, wherein the instructions are further translatable by the processor for:

requesting, via the source-specific connector respectively, each of the source systems to restore access to the applications by the set of accounts associated with the population of identities, or to exclude the set of accounts associated with the population of identities in restoring access to the applications in the enterprise computing environment.

\* \* \* \* \*